US005406685A

United States Patent [19]

Harmand

[11] Patent Number: 5,406,685

[45] Date of Patent: Apr. 18, 1995

[54] PULLING TOOL FOR EXTRACTING RING INSERTS

[76] Inventor: Brice Harmand, 5275 Toscana Way, Apt. 124, San Diego, Calif. 92122

[21] Appl. No.: 138,465

[22] Filed: Oct. 15, 1993

[51] Int. Cl.[6] .............................................. B23P 19/04

[52] U.S. Cl. ........................................ 29/255; 29/235

[58] Field of Search .............. 29/263, 235, 267, 240.5, 29/213 R, 234, 280, 282, 252, 254, 255

[56] References Cited

U.S. PATENT DOCUMENTS

| | | | |
|---|---|---|---|
| 2,814,098 | 11/1957 | Kessell | 29/267 |
| 3,252,210 | 5/1966 | Bowden | 29/267 |
| 4,586,230 | 5/1986 | Hardzak et al. | 29/254 |
| 4,765,049 | 8/1988 | Lundquist | 29/267 |
| 4,944,081 | 7/1990 | Ross | 29/235 |

OTHER PUBLICATIONS

Snap-On 1991-1992 Catalog, pp. 252-256.
Professional Tool & Equipment News, Nov. 1993, p. 66.
Applicant Sales Brochure, Published Oct. 22, 1993.

*Primary Examiner*—Robert C. Watson
*Attorney, Agent, or Firm*—Brown, Martin, Haller & McClain

[57] ABSTRACT

The pulling tool has a handle attached to a housing and a lever pivotally attached to the housing. The lever controls a feed pad which applies an upward force to a shaft which slides freely through a bore in the housing in a direction generally perpendicular to the handle. At the end of the shaft is a cone and which cooperates with at least two toothed claws which are pivotally mounted on a lower extension of the housing. Each claw is sloped on its inner edge to cooperate with the sloped edge of the upper part of the cone so that, as the cone moves upward, the claw pivots so that the toothed portion of the claw is forced outward. The cone and claws are selected to fit closely within the opening in the insert. When the lever is depressed, the shaft is lifted, pulling up on the cone which causes the teeth of the claws to penetrate the metal of the insert on its inner diameter to firmly lock into the insert.

11 Claims, 3 Drawing Sheets

PULLING TOOL FOR EXTRACTING RING INSERTS

BACKGROUND OF THE INVENTION

A number of tools are commercially available for extracting rings, bushings or other inserts which are tightly fitted within a confined recessed area. A particular example of an insert which must, on occasion, be extracted is the valve seat within a cylinder head on an internal combustion engine. Typically, the existing pullers have jaws, usually two or three jaws, which work with the force created by either a slide hammer or a screw. The jaws are clamped against the part to be removed with a screw/bolt system, then the force is applied to the puller to remove the part.

Several difficulties can be experienced by the users of such pullers. Among these problems is the loosening of the jaws as a result of the application of force, which may be applied as either a rapid strike of a hammer or as a slow compression by turning the screw. This results in repeated interruption of the process to re-tighten the pressure of the jaws on the part. Such interruptions can be particularly problematic when the location of the insert to be removed is difficult to reach and the angle of approach is awkward. The size of many pullers compounds the difficulties experienced in hard-to-reach places.

Another disadvantage of existing pullers is that they are easily thrown off-balance when the force is applied, resulting in the majority of the force being applied to one jaw only. This can either cause the jaw to break, or can pull the insert out at an angle. As with the frequent loosening of the jaws, they must be repositioned repeatedly during the operation before the insert is completely extracted.

Conventional pullers are usually heavy and bulky due to the length of the threaded shaft of the screw-type puller or due to the size of the slide hammer itself in the impact-type puller.

In order to avoid damaging the housing from which the insert is being removed, a spacer ring is often used to rest on the ring or other insert to be removed. This "blinds" the operator, preventing visual control of how the jaws clamp the insert.

Methods of extracting press fitted valve inserts (valve seats) in engine cylinder head include: 1) metal turning, where the valve insert is machined out of the cylinder head. This method is time consuming and expensive, but does not damage the housing in the cylinder head. 2) Welding a cord inside of the valve seats to loosen the seat out of its housing when the metal cools down and retracts. This process is also time consuming and may cause deterioration of the surrounding surfaces by distributing slag around the work site. To avoid this damage, the user must protect the surrounding surfaces, especially the valve guides in the cylinder head. 3) Using conventional pullers as described above, which is inefficient and time consuming. 4) Inserting a lever inside of the ring or insert to lift it out of the housing. Commonly, the insert will come out at an angle, damaging the housing. If the housing is damaged, it will have to be machined to removed the damage, and the resulting larger diameter requires the use of repair inserts-an insert which is of a non-standard size.

BRIEF SUMMARY OF THE INVENTION

It is an advantage of the present invention to provide an impact puller that applies a uniform force for removal of a valve seat from an engine cylinder head to avoid requiring frequent repositioning and adjustment of the tool.

It is a further advantage of the present invention to provide a tool for extraction of valve seats, rings, or other inserts which introduces minimal risk of damage to the housing from which the insert is being removed.

Still another advantage of the present invention is to provide a tool which has minimal risk of breakage during use when compared with conventional pullers.

Yet another advantage of the present invention is to provide a puller which is compact and easy to use regardless of the location and angle required for access to the insert to be removed.

In an exemplary embodiment, the pulling tool has a handle attached to a housing and a lever pivotally attached to the housing. The lever controls a feed pad which applies an upward force to a shaft which slides freely through a bore in the housing in a direction generally perpendicular to the handle. At the end of the shaft is a cone which works in cooperation with a pivotally mounted toothed claw combination, with at least two claws. Each claw is supported by an extension or "claw arm" which extends outward from the housing and has one or more pivot points within which the pivot axis of the claw may be disposed. Each claw is sloped on its inner edge to cooperate with the sloped edge of the upper part of the cone so that, as the cone moves upward, the claw pivots so that the toothed portion of the claw is forced outward. The cone and claws are selected to fit closely within the opening in the insert. When the lever is depressed, the shaft is lifted, pulling up on the cone which causes the teeth of the claws to penetrate the metal of the insert on its inner diameter to firmly lock into the insert. While the pressure is maintained on the lever, a pneumatic impact puller attached to the upper end of the shaft is activated by introducing compressed air into a piston and cylinder combination to provide rapidly repeated strikes of moderate force in an upward direction to pull the insert from the housing. After the insert has been extracted from the housing, a release lever loosens the feed pad from the shaft, allowing the force on the claws to be released so that the insert can be removed from the claws, readying the pulling tool to extract the next insert.

The cone and claws are changeable to allow use of the puller in different diameter openings. A fastener at the end of the shaft is used to allow the cone to be removed and replaced. The claws can be of different lengths, and can also be adjusted to be effective in larger diameter openings by shifting the pivot axis of the claw outward to a different pivot point on the claw support arm.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

The following detailed description uses relative positions, e.g., top and bottom, or upper and lower, for illustrative purposes only, to coincide with the orientation of the figures. This description should not be taken to indicate that the inventive puller is limited to operation in such an orientation.

Figure 1:
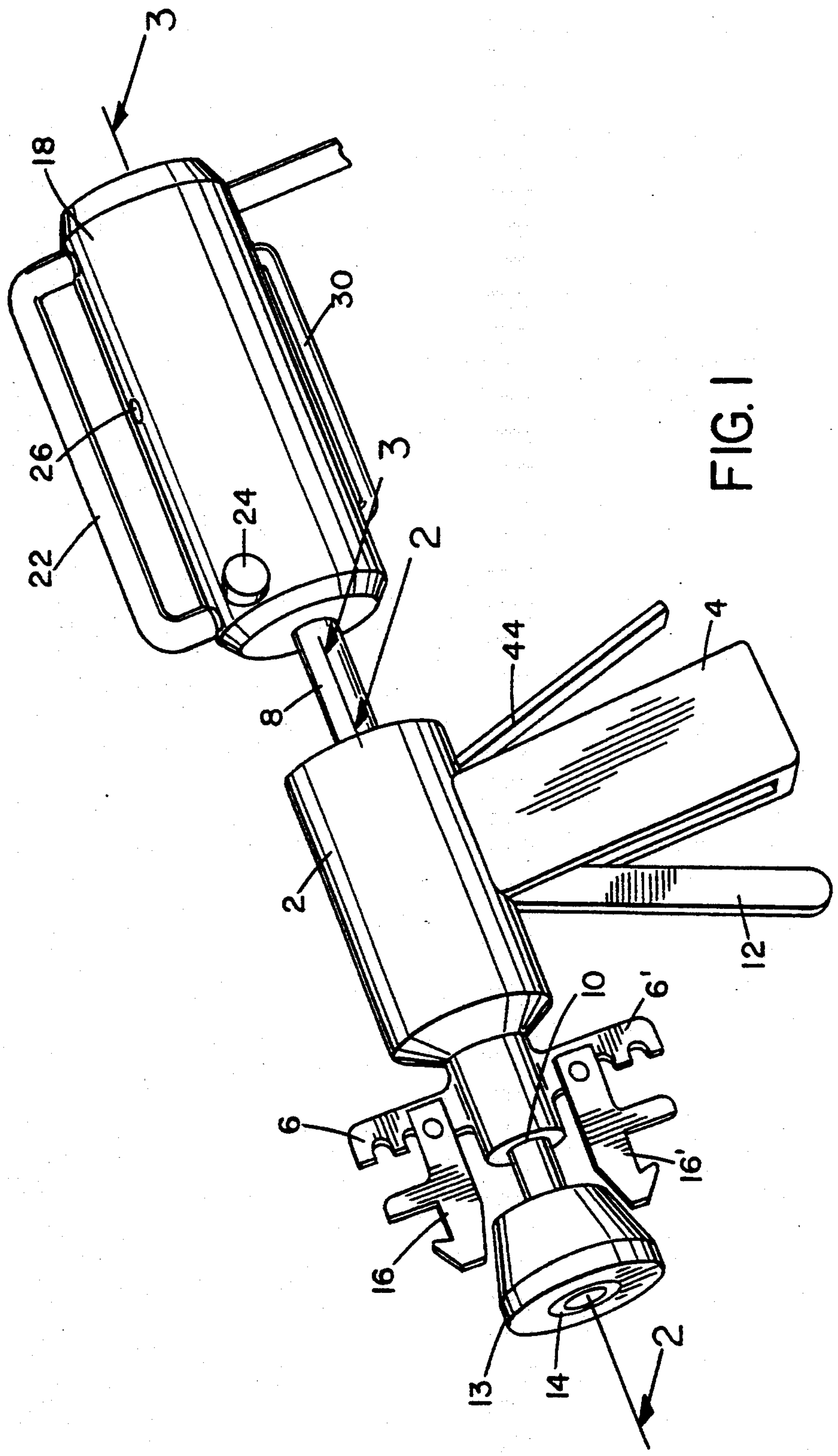
FIG. 1 is a perspective view of the pulling tool of the present invention.

As illustrated in FIG. 1, the pulling tool of the present invention comprises a housing 2 to which is attached a handle 4 and a pair of claw arms 6 and 6′ which are disposed at 180 degrees with respect to each other. (Note that any number of claw arms may be used, in which case the arms will be disposed at even spacings. For example, if three arms are used, the claw arms will be spaced at 120 degrees.) Shaft 8 moves slideably through bore 10 in housing 2 in a direction generally perpendicular to the handle 4. Lever 12 pivots within housing 2 to create an upward force on shaft 8 by means that will be more clearly described below. At the lower end of shaft 8 a cone 13 is firmly but releasably held in place by a fastener 14. Claws 16 and 16′ are pivotally disposed on claw arms 6 and 6′, respectively.

At the upper end of shaft 8 is attached a pneumatic driver comprising a cylinder 18 and piston 20 (shown in FIG. 3) driven by compressed air introduced into cylinder 18 through air hose 22. Once activated by depressing activator button 24, the pneumatic driver produces a rapidly pulsed force on the shaft 8 in an upward direction. The pulsing is enabled by air apertures 26 and 26′ which allow the compressed air to escape from the cylinder after the piston 20 has been lifted. The pressure differential in the cylinder opens relief valve 28 which redirects the compressed air through air hose 30, forcing the piston 20 back down to the bottom of the cylinder 18. The continuous application of compressed air into the cylinder 18 produces repeated shocks of moderate force which, when applied to the shaft 8 cause a uniform lifting motion for removal of a valve seat 40 or other insert within a corresponding housing 42, which, in the case of a valve seat is an engine cylinder head. (The valve seat 40 and housing 42 are shown in FIGS. 4*a*–4*c*.) Once the valve seat 40 has been extracted from its housing 42, release lever 44 is depressed to release the shaft 8, allowing the claws and the cone 13 to be separated so that the claws can be retracted from the valve seat and the valve seat removed.

Figure 2:
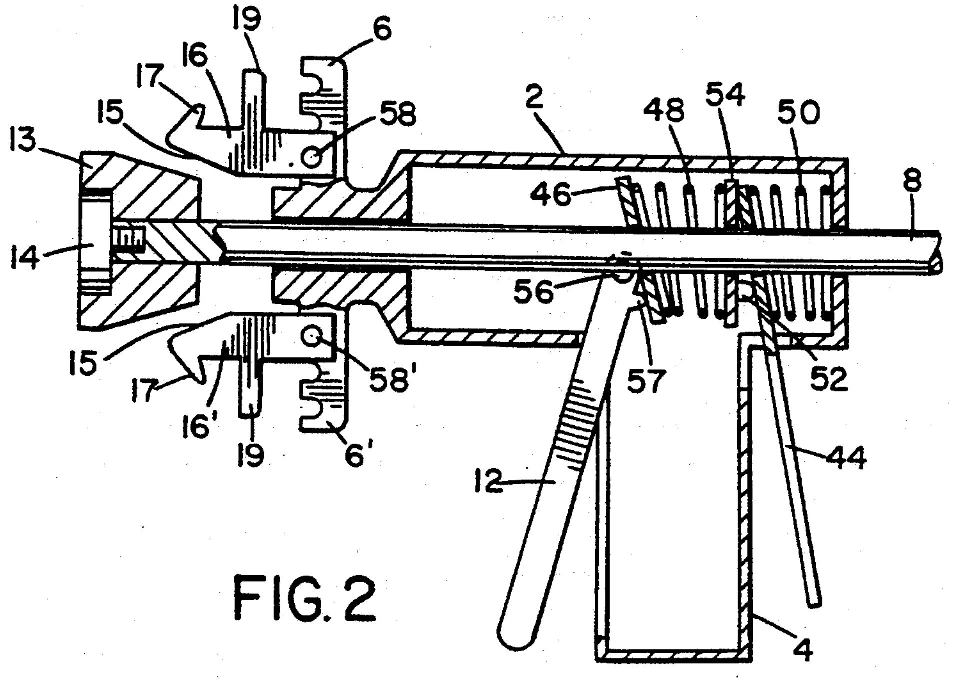
FIG. 2 is a cross-sectional view taken along line 2—2 of FIG. 1.
Figure 3:
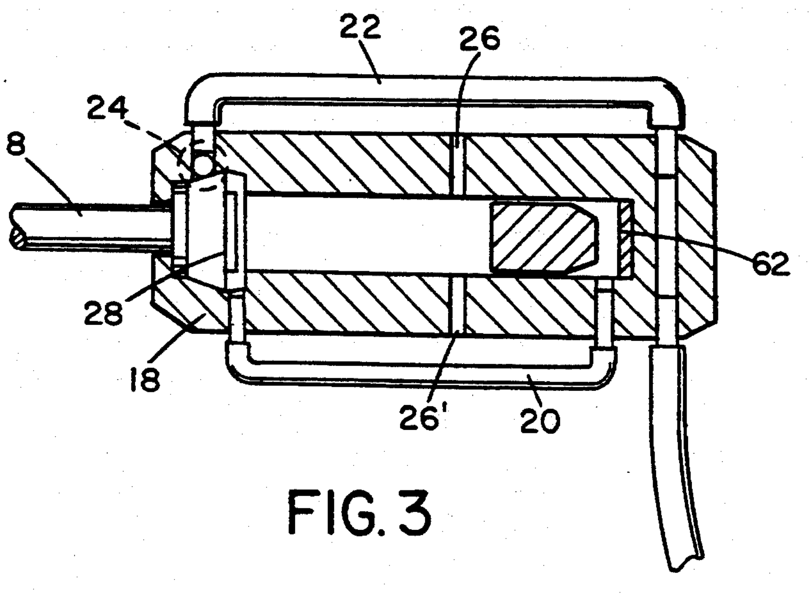
FIG. 3 is a cross-sectional view taken along line 3—3 of FIG. 1.
Figure 4C:
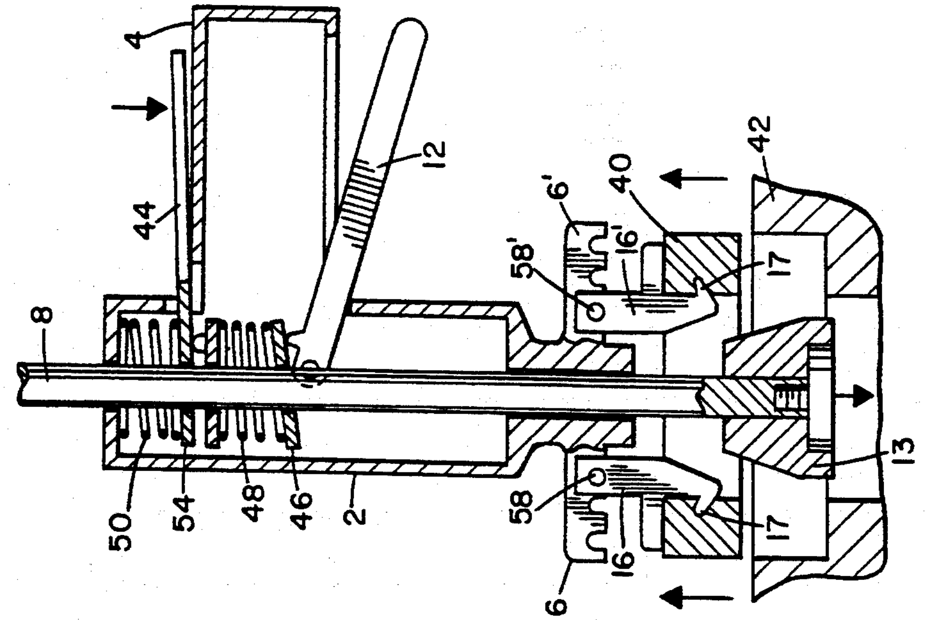
FIGS. 4*a*, 4*b* and 4*c* illustrate the action of the claw prior to application of force, after application of force, and after removal of the insert, respectively.
Figure 4B:
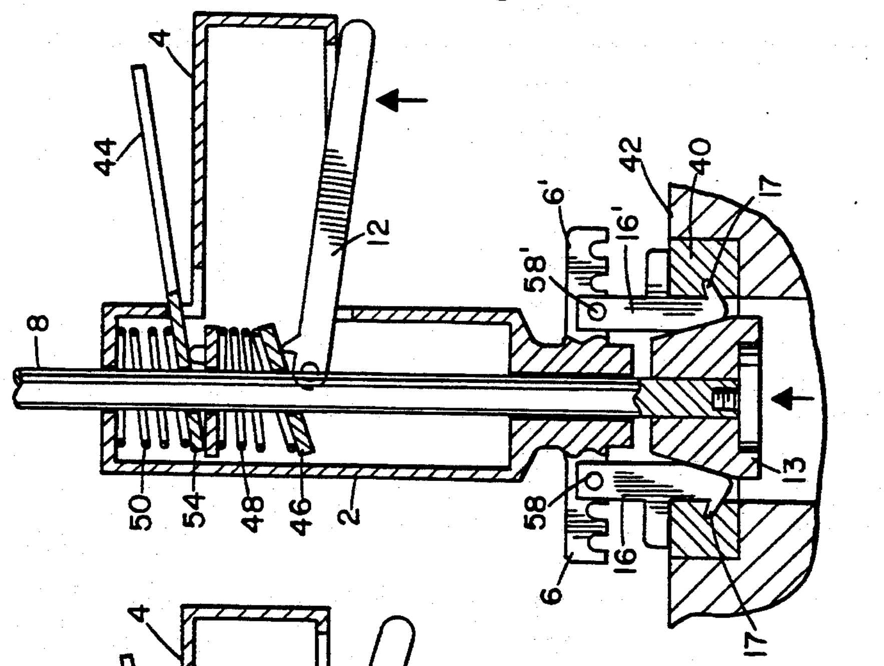
Figure 4A:
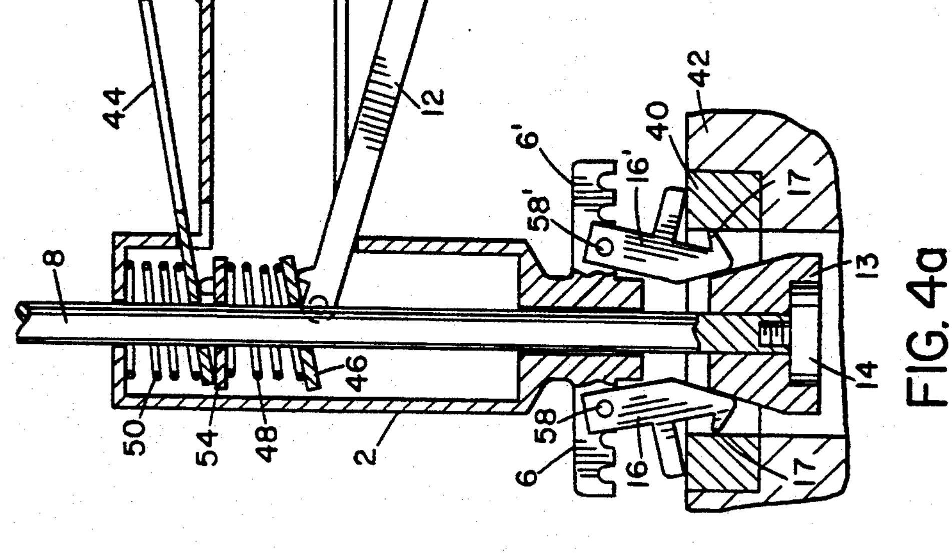

The functional elements of the invention can be more clearly seen in FIGS. 2 and 3, which are the cross-sections of the housing 2 and cylinder 18, respectively.

As illustrated in FIG. 2, the functional elements within housing 2 are the feed pad 46, springs 48 and 50, fulcrum 52, plate 54 and lever pivot pin 56. Spring 48 maintains feed pad 46, essentially a washer-like ring, at an angle such that shaft 8 can slide freely through feed pad 46 until it is activated. To create the initial force to lift the cone 13, lever 12 is pulled upward toward handle 4 so that it pivots on pivot pin 56 which is attached to housing 2. Lug 58 on the inner end of lever 12 places an upward force on the bottom of feed pad 46, compressing the inner side of spring 48 and causing the angle of feed pad 46 with respect to shaft 8 to increase, pitting the inner edges of feed pad 46 tightly against shaft 8 and producing an upward motion of the shaft. This upward motion of the shaft causes an upward motion of cone 13 with respect to the claws 16 and 16′. The claws each have a tooth 17 extending outward and an inside angle 15 opposite the tooth. A lip 19 extends from the claw above tooth 17 to catch the top surface of the insert to be removed. The outside angle of cone 13 cooperates with the inside angles 15 of claws 16 and 16′ to increase the outward force on the teeth of the claws as the cone is lifted. The claws pivot on pivot pins 58 and 58′ driving the teeth 17 outward so that they dig into the interior wall of valve seat 40. Pressure is maintained on lever 12 until the actual extraction means is activated, e.g., a pneumatic puller.

The construction of the claw arms 6 and 6′ is such that multiple pivot points are provided. This allows the pulling tool to be adapted for different diameter openings by moving the pivot pins 58 and 58′ to the appropriate pivot point. The claws must be moved symmetrically so that the force applied by the pulling tool is uniform within the valve seat 40.

In conjunction with the movement of the claw location on the claw arms, the cone may be changed to a larger or smaller diameter, whichever is appropriate, to adapt to different inner diameters. This change can be effected by removing fastener 14 from the end of shaft 8, and substituting the desired cone, then replacing the fastener.

Although it may be used with a sliding inertia hammer, the tool is preferably used in combination with a pneumatic driver which is shown in detail in FIG. 3.

The top of shaft 8 is attached to the bottom of cylinder 18 within which piston 20 moves upon the application and release of air pressure within the cylinder. Compressed air is introduced into cylinder 18 by depressing activator button 24 which opens a valve, permitting the compresses air to pass through air hose 22 into the bottom of cylinder 18. The compressed air lifts piston 20 so that it strikes the top 62 of cylinder 18, transferring an upward force to the cylinder and shaft 8 connected thereto. Air apertures 26 and 26′ permit the compressed air to exit the cylinder 18 once the piston has passed them in its upward travel. This change in pressure causes relief valve 28 to open, directing the compressed air through air hose 30 forcing the piston 20 back down to the bottom of the cylinder. Due to the small volume of cylinder 18 above piston 20, the return force on the piston is less than that involved in its upward travel. Once the piston reaches the bottom of cylinder 18 the process is repeated, producing a rapidly pulsed upward force on the shaft 8 with a frequency on the order of 2000 to 3000 strikes per minute. These repeated strikes allow an effective force to be applied to the shaft 8 to remove valve seat 40 without using a sudden, high power strike which can pull the jaws off of the insert or can result in an uneven transfer of force in conventional pullers.

Once the valve seat 40 (or other insert) has been extracted, the inlet valve controlled by activator button 24 is closed, removing the compressed air from the cylinder.

The basic steps for extraction of an insert are illustrated in FIGS. 4*a*–4*c*. Arrows are provided in each of these figures to indicate the direction of force. In FIG. 4*a*, the cone 13 is inserted into the open center 66 of the insert 40. The cone 13 has a maximum diameter that is slightly smaller than the inner diameter of the insert 40. The claws 16 and 16′ are inserted into the open center 66 until the lip 19 contacts the upper surface of the housing 42. In FIG. 4*b*, the lever 12 is squeezed toward handle 4 forcing feed pad 46 to push upward on shaft 8. This lifts the cone 13 so that its sloped edge applies pressure to the inward slope 15 of claws 16 and 16′. As a result of this pressure, the claws pivot on pivot pins 58 and 58′, driving the teeth 17 into the inner wall of insert 40. The force on lever 12 is maintained until the pneumatic puller or other means for applying an upward force is activated.

After the insert 40 has been extracted from the housing 42, release lever 44 is depressed to release the feed pad's hold on the shaft 8, as shown in FIG. 4*c*. Release lever 44 consists of a washer-like ring at the end of a lever with the interior diameter of the ring portion being slightly larger than the outer diameter of the shaft 8. When release lever 44 is depressed, fulcrum 52 causes the ring portion of the lever 44 move upward so that the inner edges of the ring portion pit themselves against shaft 8, causing shaft 8 to move upward. (Spring 50 holds the release lever 44 so that it is not in contact with shaft 8 until release is desired.) The upward movement of the shaft 8 relieves the pressure of the cone 13 on the claws 16 and 16′. The claws can then be manually pivoted inward to release their hold on the interior wall of the insert 40.

The air pressure for driving the pneumatic puller can be regulated to increase the number of strikes. In the process of extracting value seats from a cylinder head it is possible to determine the amount of pull needed to extract the first valve seat, then use the same inlet air pressure to removed subsequent valve seats. Also, the size of the cylinder and piston determines the amount of force provided. For greater force, larger diameter cylinders and pistons can be used. The impact puller of the present invention will work for extraction of virtually any type of ring insert. The puller does not damage the housing around the insert, and is capable of rapidly extracting the insert without requiring repeated positioning and adjustment of the tool. The pneumatic impact provides the efficiency needed using lesser forces, further minimizing the risk of damage to the housing.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. A pulling tool for extraction of a valve seat from a recessed area in an engine cylinder head, said valve seat having an interior wall with an inner diameter, the pulling tool comprising:

a housing having a handle and a bore therethrough, said bore being generally perpendicular to said handle;

a shaft slideably disposed within said bore, said shaft having an axis, a first end and a second end;

at least two extension arms extending from said housing, each extension arm having means thereon for pivotally retaining a pivot pin, said extension arms being spaced around said housing with an even spacing;

a claw attached to said pivot pin pivotally disposed on each of said extension arms, said claw having a tooth on an outside edge and having an inside angle on an inside edge opposite said outside edge where said inside angle extends away from said tooth;

a cone disposed on said first end of said shaft, said cone having an outside angle for cooperating with said inside angle of said claw and an outer diameter to fit within said inner diameter of said valve seat;

claw expanding means for applying an axial gripping force to said shaft to slide said shaft within said bore so that said cone is drawn toward said housing with said gripping force being transferred from said outside angle of said cone to said inside angle of said claw to pivot said claw on said pivot pin, forcing said tooth outward away from said shaft and into said interior wall of said valve seat; and pulling means for applying a rapidly pulsed axial pulling force to said shaft to move said housing and said claws in an axial direction away from said cylinder head.

2. A pulling tool as in claim 1 wherein said claw expanding means comprises:

a lever pivotally attached to said housing with a lug disposed on an edge of said lever adjacent a lever pivot point; and a feed pad slideably disposed over said shaft and positioned at an angle with respect to said shaft;

wherein said lug transfers a force to an edge of said feed pad when said lever is pivoted at said lever pivot point causing said feed pad to press against said shaft and moving said shaft in the same direction that said lever is moved.

3. A pulling tool as in claim 1 wherein said pulling means comprises a pneumatic driver which comprises:

a cylinder having an inner diameter, a first end and a second end;

a piston disposed within said cylinder;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

4. A pulling tool as in claim 1 wherein two extension arms are disposed on said housing and said even spacing is 180 degrees.

5. A pulling tool as in claim 1 wherein three extension arms are disposed on said housing and said even spacing is 120 degrees.

6. A pulling tool as in claim 1 where each said extension arm has a plurality of pivot points whereby said claw may be positioned at different distances from said shaft.

7. A device for removing a ring insert from a recessed housing, said ring insert having an interior wall, said device comprising:

a body having a bore therethrough;

a shaft slideably disposed within said bore, said shaft having an axis, a first end and a second end;

at least two extension arms extending from said body, each extension arm having means thereon for pivotally retaining a pivot pin, said extension arms being spaced around said body with an even spacing;

a claw attached to said pivot pin pivotally disposed on each of said extension arms, said claw having a tooth on an outside edge and having an inside angle on an inside edge opposite said outside edge where said inside angle extends away from said tooth;

a cone disposed on said first end of said shaft, said cone having an outside angle for cooperating with said inside angle of said claw and an outer diameter to fit within said inner diameter of said ring insert;

claw expanding means for applying an axial gripping force to said shaft to slide said shaft within said bore so that said cone is drawn toward said housing with said gripping force being transferred from said outside angle of said cone to said inside angle of said claw to pivot said claw on said pivot pin, forcing said tooth outward away from said shaft and into said interior wall of said ring insert; and pulling means for applying a rapidly pulsed axial pulling force to said shaft to move said body and said claws in an axial direction away from said housing.

8. A device as in claim 7, wherein said claw expanding means comprises:

a lever pivotally attached to said housing with a lug disposed on an edge of said lever adjacent a lever pivot point; and a feed plate slideably disposed over said shaft and positioned at an angle with respect to said shaft;

wherein said lug transfers a force to an edge of said feed plate when said lever is pivoted at said lever pivot point causing said feed plate to press against said shaft and moving said shaft in the same direction that said lever is moved.

9. A device as in claim 7, wherein said pulling means comprises a pneumatic driver which comprises:

a cylinder having an inner diameter, a first end and a second end;

a piston disposed within said cylinder;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

10. A pulling tool for pulling a first workpiece out of frictional engagement with second workpiece, comprising:

a shaft having a distal end, a proximal end, and an axis;

a pneumatic driver connected to said proximal end of said shaft, said pneumatic driver having a housing, said shaft fixedly disposed with respect to said housing, said pneumatic driver having means for applying a rapidly pulsed axial pulling force to said housing, said housing not rigidly disposed with respect to said second workpiece; and a grip selectably attachable to said first workpiece.

11. The pulling tool as in claim 10, wherein said pneumatic driver comprises:

a cylinder having an inner diameter, a first end and a second end, said cylinder fixedly disposed within said housing;

a piston disposed within said cylinder and not connected to said shaft;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

* * * * *